(12) United States Patent
Taylor et al.

(10) Patent No.: US 7,033,519 B2
(45) Date of Patent: Apr. 25, 2006

(54) METHOD OF FABRICATING SUB-MICRON STRUCTURES IN TRANSPARENT DIELECTRIC MATERIALS

(75) Inventors: Rod Taylor, Ottawa (CA); Cyril Hnatovsky, Ottawa (CA); Paul Corkum, Gloucester (CA); David Rayner, Ottawa (CA); Ravi Bhardwaj, Ottawa (CA)

(73) Assignee: National Research Council of Canada, Ottawa (CA)

( * ) Notice: Subject to any disclaimer, the term of this patent is extended or adjusted under 35 U.S.C. 154(b) by 154 days.

(21) Appl. No.: 10/431,442

(22) Filed: May 8, 2003

(65) Prior Publication Data

US 2003/0235385 A1    Dec. 25, 2003

Related U.S. Application Data

(60) Provisional application No. 60/319,236, filed on May 8, 2002.

(51) Int. Cl.
*C03C 25/68* (2006.01)

(52) U.S. Cl. .............................. 216/87; 216/2; 216/24; 216/97; 216/108; 216/109; 219/121.69

(58) Field of Classification Search ............... 216/2, 216/24, 87, 97–99, 103, 104; 219/121.69
See application file for complete search history.

(56) References Cited

U.S. PATENT DOCUMENTS

| | | | |
|---|---|---|---|
| 6,268,586 B1 * | 7/2001 | Stuart et al. ............ 219/121.72 |
| 6,433,305 B1 * | 8/2002 | Liu et al. ................ 219/121.71 |
| 6,573,026 B1 * | 6/2003 | Aitken et al. ................ 430/290 |
| 6,754,429 B1 * | 6/2004 | Borrelli et al. .............. 385/137 |
| 6,772,514 B1 * | 8/2004 | Ogura et al. .................... 29/846 |
| 2002/0076655 A1 * | 6/2002 | Borrelli et al. .............. 430/321 |
| 2003/0099264 A1 * | 5/2003 | Dantus et al. ................. 372/25 |

FOREIGN PATENT DOCUMENTS

WO    WO 02/16070 A2    2/2002

OTHER PUBLICATIONS

Wolf, Silicon Processing for the VLSI Era, 2002, Lattice Press, vol. 4, pp. 672-673.*

(Continued)

*Primary Examiner*—Nadine G. Norton
*Assistant Examiner*—Eric B. Chen
(74) *Attorney, Agent, or Firm*—Marks & Clerk; Richard J. Mitchell

(57) ABSTRACT

A sub-micron structure is fabricated in a transparent dielectric material by focusing femtosecond laser pulses into the dielectric to create a highly tapered modified zone with modified etch properties. The dielectric material is then selectively etched into the modified zone from the direction of the narrow end of the tapered zone so that as the selective etching proceeds longitudinally into the modified zone, the progressively increasing width of the modified zone compensates for lateral etching occurring closer to the narrow end so as to produce steep-walled holes. The unetched portion of the modified zone produced by translating the laser beam close to and parallel to the bottom surface of the dielectric can serve as an optical waveguide to collect light from or deliver light to the etched channel which can contain various biological, optical, or chemical materials for sensing applications.

47 Claims, 7 Drawing Sheets

OTHER PUBLICATIONS

Wolf et al., Silicon Processing for the VLSI Era, 1986, Lattice Press, vol. 1, pp. 532-533.*

"Three-dimensional hole drilling of silica glass from the rear surface with femtosecond laser pulses", Yan Li, OPTICS LETTERS, vol. 26, No. 23, 2001, pp. 1912-1914.

"Femtosecond laser-assisted three-dimensional microfabrication in silica", Andrius Marcinkevicius et al., OPTICS LETTERS, vol. 26, No. 5, 2001, pp. 277-279.

"Improved all-optical switching in a three-slab nonlinear directional coupler with gain", Fabrizio Di Pasquale et al., IEEE, vol. 30, No. 5, 1994, pp. 1254-1248.

"Microfabrication and characteristics of two-dimensional photonic crystal structures in vitreous silica", Hong-Bo Sun et al., OPTICAL REVIEW, vol. 6, No. 5, 1999, pp. 396-398.

"Three-dimensional microdrilling of glass by multiphoton process and chemical etching", Yuki Kondo et al., Apply. Phys., vol. 38, 1999, pp. 1146-1148.

* cited by examiner

SIMS FS holes NSOM G

Femtosec. Etch NA 0.45 SiO2 group 3 1,5μ

METHOD OF FABRICATING SUB-MICRON STRUCTURES IN TRANSPARENT DIELECTRIC MATERIALS

CROSS REFERENCE TO RELATED APPLICATION

This application claims the benefit under 35 USC 119(e) of U.S. provisional application No. 60/319,236 filed May 8, 2002.

FIELD OF THE INVENTION

This invention relates to the field of microstructure fabrication, and in particular to a method of fabricating sub-micron structures in transparent dielectric materials.

BACKGROUND OF INVENTION

There is a need to integrate materials with optical waveguides for both sensing applications as well as a means to alter the properties of the propagating light. The integration can include, for example, biological and chemical samples, polymers, liquid crystals as well as non-linear optical and modulator materials. Such integration can benefit from the manufacture of dense arrays of sub-micron wide, high aspect ratio holes (with attoliter volumes; 1 attoliter=$10^{-18}$ liters) or channels in dielectric materials, such as glass which are interfaced directly with adjoining optical waveguides for light delivery and light detection with the holes or channels.

There is also a need to fabricate 2-D and 3-D photonic crystal structures such as arrays of closely spaced holes in glass to assist in light guidance. Such structures might be used, for example, to construct compact turning mirrors for integrated photonic circuits.

Optical components, such as variable optical attenuators or all optical switches, may also be based upon the integration of holes/channels and optical waveguides. Also, there is a need to fabricate narrow wires to electrically connect integrated photonic devices and to fabricate miniature integrated RLC electrical circuit components in a dielectric chip. There is also a need to form miniature electrodes for biological screening applications.

The fabrication of holes or channels in transparent dielectrics can currently be accomplished using various drilling techniques such as Focused Ion Beam (FIB) and high peak power laser ablation. One example of the latter technique is described in the paper "Three-dimensional hole drilling of silica glass from the rear surface with femtosecond laser pulses" (Opt. Lett., 26, pp. 1912–1914,2001). The authors of this paper claim to have produced high aspect ratio holes with diameters as small as 4 μm using water to assist in removing ablation debris.

Recently femtosecond laser pulses have been used to modify special UV sensitive photomachinable glass which when combined with chemical etching (Y. Kondo, J. Qiu, T. Mitsuyu, K. Hirao and T. Yoko, Jpn. J. Phys. 38, pp. LL1146–1148, 1999) can be used to make 10 μm diameter holes. The paper entitled "Femtosecond laser-assisted three-dimensional microfabrication in silica" (A. Marcinkevicius et al, Opt. Lett. 26, pp. 277–279, 2001) describes the use of a very high NA (1.3) oil immersion microscope objective to create a column of small micron cubed damage volumes (voxels) in silica which when etched creates a hole or channel with much larger diameter (10 μm) than the diffraction limited laser spot size (1 μm). This occurs since the etching rate in the highly damaged zone is much higher than in the unmodified zones. This creates a long narrow hole which can act as a reservoir to trap acid to permit lateral etching to occur at the same time and at the same rate over the entire length of the hole opening up the hole in a uniform manner. The "voxels" are highly damaged zones of modified silica and cannot be used to form low loss optical waveguides. There is no evidence to suggest that sub-micron holes or channels can be made in this way. The use of such high NA objectives also severely restricts the distance between the lens and the irradiated zone (e.g. a few hundred microns).

U.S. Pat. No. 5,919,607 describes the use of light absorption in boron doped glass together with chemical etching to produce large channels and other large structures.

Microfabrication techniques, such as Reactive Ion Etching (RIE) use mask, ion beam and etching technologies to make precise holes or channels in glass. It is possible to use microfabrication techniques to construct optical waveguides with adjoining channels fabricated into the surface of dielectric materials. The fabrication of a waveguide that extends from the surface deep into the substrate is difficult to accomplish with conventional microfabrication techniques.

There are self-organization techniques, e.g. using colloidal particles, as well as microfabrication techniques, which can be used to make 2-D photonic crystal structures (H-B Sun, Y. Xu, S. Matsuo and H. Misawa, Optical Rev., 6, pp. 396–398, 1999).

It is believed that no-one has successfully made a practical 2-D photonic crystal band gap structure for telecom wavelengths in bulk glass with any of the above techniques. The construction of 3-D photonic band-gap structures is considerably more difficult and has met with limited success. The concept of using femtosecond lasers to fabricate holes to form a 2-D photonic crystal structure band-gap structure has been described in U.S. Pat. No. 6,134,369, Date of Patent Oct. 17, 2000. However, methods on how to make the holes were not discussed.

One way to make a variable optical attenuator is to use a temperature sensitive, absorbing polymer as a cladding layer in an optical waveguide. A controlled heat source can be used to vary the temperature of the polymer and therefore the attenuation. The waveguide core can be reduced in size in the vicinity of the polymer in order to force more of the waveguide mode into the cladding region to enhance attenuation. An optical switch can be constructed based upon the attenuator design and switching the heat source on and off on top of the polymer.

Microfabrication techniques could also be used to construct an all optical switch based upon three coupled waveguides in which the central waveguide contains a doped core (e.g. Erbium) which when optically pumped (e.g. at 980 nm) produces gain at telecom wavelengths which promotes the switching of near-infrared light from one outside guide to the other outside guide as proposed by F. Di Pasquale and E. Hernandez-Figueroa (IEEE J. Quantum Electron., 30, pp. 1254–1258, 1994).

Mask and various metal coating techniques are currently used to micro fabricate fine wires as well as RLC circuit elements and electrodes into a dielectric.

State of the art laser drilling or laser induced dielectric modification followed by chemical etching techniques have not been able to produce clean, deep, sub-micron wide holes or channels in transparent dielectric materials. Hole diameters are generally >4 μm and are rough. It has also not been possible to make an adjoining waveguide to the channel or hole.

Microfabrication can be used to make a number of devices incorporating the integration of materials with optical waveguides. However microfabrication is best suited to making large quantities of a single device. It requires access to sophisticated laboratories, which are not always available and are costly to setup. The production of numerous different devices with modest product volumes can benefit from alternative manufacturing techniques such as those based upon computer controlled laser writing. Laser writing is very flexible and can adapt quickly to new designs, leading to rapid prototyping. Laser writing techniques operate under ambient conditions and are easier to integrate with other manufacturing processes.

SUMMARY OF INVENTION

According to the present invention there is provided a method of fabricating a microstructure in a transparent dielectric material, comprising focusing femtosecond laser pulses into said dielectric at a sufficient peak laser power, intensity, and laser dosage to create a highly tapered modified zone having a length: width ratio $\geqq 4:1$ with modified etch properties, said tapered modified zone having at least one tip with a diameter less than about 250 nm; and selectively etching into said modified zone.

The modified structure can be in the form of a single conical structure with a base, in which case the diameter of the base is typically greater than about 1 µm, or it can be in the form of a double conical structure with tips extending outwardly from a central base region, or region of maximum diameter, which typically has a diameter in the order of 600 nm. In the case of the double conical structure the tips typically have a diameter of about 100 nm. The double conical structure is useful for producing narrow shallow holes near the top surface of the dielectric material.

The laser pulses can be generated with a single laser or multiple lasers. In the latter case multiple laser beams can be combined to generate the pulses and permit the field distribution in the focal volume of said laser beams to be changed so as to vary the shape of said modified zone.

Alternatively, an aspherical lens element(s) can be included in said laser beam to change the field distribution in the focal volume of said laser beam to vary the shape of said modified zone.

The state of polarization of the laser can be unpolarized or linear and with the plane of polarization being rapidly rotated.

A microstructure typically has channels with sub-micron diameters, although the diameters could extend into the micron range, and, for example, be several microns. An important advantage of the invention, however, is that it is capable of creating structures with sub-micron lateral dimensions but with depths of microns.

A femtosecond is $10^{-15}$ seconds. A femtosecond laser generates pulses in the femtosecond range. The femtosecond laser used by the inventors typically had a pulse duration of 30–40 femtoseconds. However, similar performance for fabricating microstructures can be anticipated for pulse durations on either side of this value e.g. 20 fs to 150 fs.

The laser beam can be fixed relative to the sample. In this case, the laser dosage is the product of the energy per pulse times the number of pulses delivered to the modified zone. It is typically varied in the range determined by altering the energy per laser pulse from 0.01 to 3 µJ and the number of shots between 500 and 5000.

Alternatively, the beam can be displaced relative to the sample. In this case, where the sample is scanned as it is being irradiated, dosage refers to the cumulative energy per micron of translation and is the product of the energy/pulse times the repetition rate of the laser and divided by the scan rate. The dosage in typically varies in the range determined by the energy per pulse from 0.01 to 1 µJ; the repetition rate from 10–250 kHz and the scan rate from 10–200 µm/s.

Preferably, the tapered modified zone is located inside the material so that the laser intensity near the surface is too low to modify the surface, and etching takes place from the tip of the tapered zone so that as said selective etching proceeds longitudinally into said modified region, the progressively increasing width of said tapered zone compensates for lateral etching occurring at said narrow end. However, a tapered zone near the top surface can be used in certain applications, for example, in microfluidic applications, to create tapered holes, for use, for example, as nozzles.

The invention is based in part on the discovery that the amplified femtosecond laser pulses appropriately focused into a dielectric material create a conical zone of modified material having sufficient length, taper angle and degree of material modification such that when the conical structure is placed near the bottom surface of the bulk dielectric (i.e. the narrow tip region of the conical structure is near the bottom surface) and chemically etched, it produces steep sidewall, sub-micron wide holes or channels.

The method in accordance with the invention allows sub-micron structures to be created in dielectrics, such as glass. The method takes advantage of the highly tapered shape of the modified zone induced in the dielectric material by the focused amplified femtosecond laser pulses. When a series of high repetition rate (10–250 kHz), for example, Ti:sapphire femtosecond laser pulses ($\lambda$=800 nm) with power levels above a threshold value (approximately $1 \times 10^6$ W) are appropriately focused (with e.g. a NA=0.7 microscope objective) into a silica glass block, the modified zone, which is much smaller in width and of different symmetry than that would be expected using conventional optical formulas, is produced.

It is possible to produce modified zones that have upper and lower portions directed away from a central wider portion terminating in respective tips. In this case, the wider portion is considered the base of the modified zone.

A second novel aspect of the invention is the use of the femtosecond laser modified regions adjoining the channels as waveguides to couple light into or out of the channels. This is made possible since the modified regions are uniform in composition and can provide low loss light propagation. Furthermore by retracting the focused laser beam from the bottom surface, it is possible to both modify the dielectric near the surface to produce a hole after chemical etching, and also create a waveguide directly on top of the hole. This waveguide can be written in the bulk material to a desired location well away from the hole.

The combination of a channel sitting on top of an adjoining waveguide, which is a feature of this invention, can be used to make telecom devices such as a variable optical attenuator. It may also be possible to insert other materials into the channels to function as modulators of the light carried just below the channel.

The capability of producing dense arrays of small submicron holes in glass can be useful in constructing 2D photonic crystal band-gap structures to enable the fabrication of compact waveguides. The freedom and flexibility of an automated laser writing technique combined with the simplicity of chemical etching provides some advantages over a microfab solution. There is an added advantage if the same femtosecond laser that creates the modified structures can also be used to write optical waveguides to interface with the etched photonic crystal structures.

The ability to produce narrow holes or channels on silica wafers could have application in the field of micro fluidics as a means of achieving a high density of channels containing very small volumes of fluid.

The coexistence of an optical waveguide above a hole or a channel can have sensor-on-a-chip applications, e.g. in the biological sciences. For example, a series of holes terminating in waveguides can serve as attoliter receptacles for biological or chemical samples, which can be irradiated with light of a particular wavelength. Light emitted from the samples can then be carried away by the waveguides coupled to the respective holes for spectral analysis. A horizontal channel adjoining a horizontal waveguide can also be used for a similar purpose. Fluid can flow through the channel, and light emitted can be carried away by the adjoining waveguide for spectral analysis. Of course, the system could also operate in reverse with the waveguide subjecting the sample to intense light in order to determine its response.

According to a further aspect of the invention there is provided a method of making an electro-optical modulator comprising firing femtosecond laser pulses into a bulk dielectric to create a tapered zone with modified etch properties; translating the focus of said laser pulses through said bulk dielectric; selectively etching into said tapered zone to create a main channel; filling said main channel with electro-optical material; firing femtosecond laser pulses into said bulk dielectric on either side of said main channel to create a tapered zone with modified etch properties; translating the focus of said laser pulses on either side of said main channel; selectively etching into said tapered zones on either side of said main channel to create side channels; and filling said side channels with metal.

The invention still further provides a method of making a method of making an all optical switch, comprising temporarily bonding together first and second dielectric components; applying femtosecond laser pulses to said first component near an interface between said components to create a tapered modified zone with modified etch properties; translating the focus of the laser pulses; creating alignment marks on the second component; separating said first and second components; etching the bottom of the first component to create a channel with an adjoining waveguide therein; partially filling said channel with refractive material; applying femtosecond laser pulses to said second component near a surface thereof to create tapered zones with modified etch properties; translating the focus of the laser pulses; etching the bottom of the second component to create a channel with an adjoining waveguide therein; at least partially filling said channels with refractive material; and recombining said first and second components with their respective channels aligned.

BRIEF DESCRIPTION OF DRAWINGS

The invention will now be described in more detail, by way of example only, with reference to the accompanying drawings, in which.

DETAILED DESCRIPTION OF THE PREFERRED EMBODIMENTS

Figure 1A:
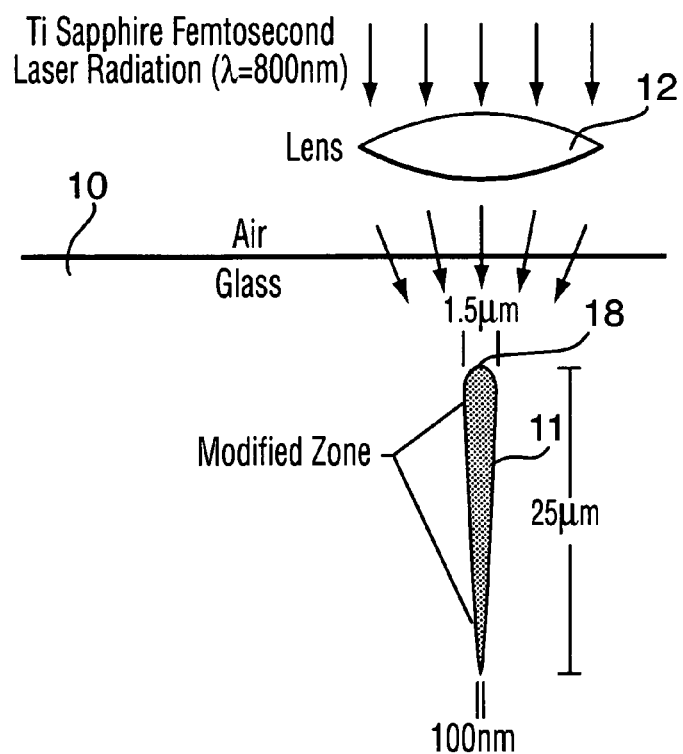
FIG. 1(a) is a schematic illustration showing a cross-sectional view of a modified zone in a glass dielectric.

In accordance with the principles of the invention, as shown in FIG. 1a, a series of high repetition rate (10–250 kHz) Ti:sapphire ($\lambda$=800 nm) femtosecond laser pulses with power levels above a threshold value (approximately $1\times10^6$ W) were focused into a silica glass block 10 through focusing lens12 (e.g. an NA≈0.7 microscope objective). This creates a highly tapered (length: width≧8:1) modified zone 11 much smaller in width and of different symmetry (FIG. 1(a)) than that expected from conventional optical formulas. The tapered zone 11 is in the form of an inverted cone with a base at the top having a diameter of 1.0 to 3 µm. The cone has very smooth steep sides. The inventors have found surprisingly that the tip at the bottom has a diameter in the order of 100 nm, and typically less than about 250 nm. This is a remarkable result because the tip size is considerably less than the wavelength of the light, typically in the order of $\lambda/8$. It is believed that the inventors" measurements are the first to reveal the extreme sharpness of these long (>15 µm) conical structures.

Figure 1B:
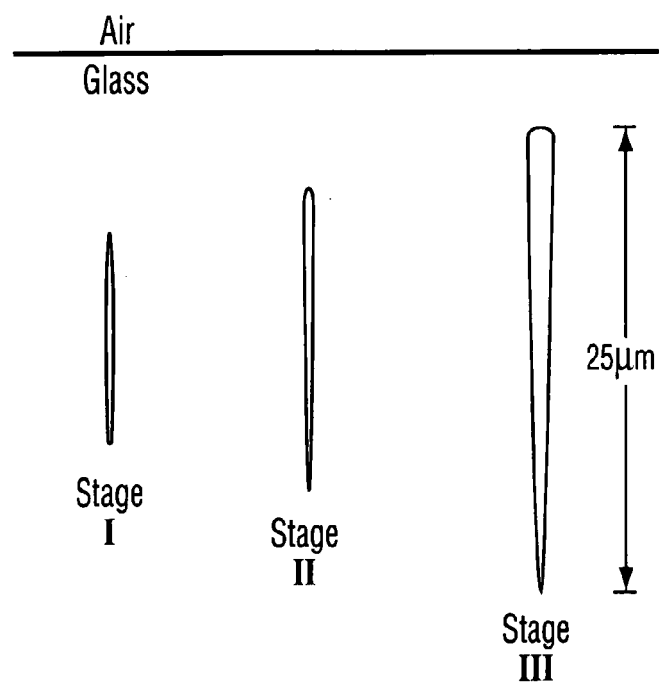
FIG. 1(b) is a schematic illustration of three important growth stages of the modified zones with increasing femtosecond laser dosage.

There are three basic stages to the growth of the conical structures with increasing laser exposure as depicted in FIG. 1(b). Stage I is typical of low energy dosage irradiation but with peak laser powers above the threshold for material modification. The conical structure is narrow (600 nm) and short (8 µm) and tapers in both directions to sharp tips in a symmetrical fashion. At higher dosages the structure grows both upwards towards the input laser beam and downwards into an elongated taper (stage II). The width of the structure also increases . With further increase in dosage the top half of the conical structure tends to square-off and has typically ×2 greater modification than the bottom portion which continues to taper to a fine tip (stage III). This shape does not change too much as the laser dosage is increased further. However, the top portion of the conical structure begins to show signs of damage.

Similar uniform conical structures and stages of growth development have been observed using Boron doped glass (BK7) at similar but lower laser dosages. However in this case it is preferable to use low laser repetition rates (e.g. 10 kHz) to form the conical structures, when one uses μJ laser pulse energies, to avoid serious thermal damage to the modified structure.

The modified zones described above 11 are very uniform and have a higher index of refraction than the surrounding material 10. The magnitude of the index of refraction difference is sufficient (Δn≈0.004) to form an optical waveguide. As just mentioned the induced index of refraction in the top part of the inverted cone (stage III) i.e. near its base, can be approximately 2× higher than in the narrow part near the tip. However, the index of refraction profile down the length of and across the tapered region is remarkably constant. There are no signs of damage processes or the formation cavities occurring in the tapered region. The transition from unmodified to modified material is extremely sharp (<100 nm), indicating a high degree of non-linearity to the modification process. The induced index of refraction saturates at higher laser energy per pulse resulting in very reproducible modified zones insensitive to pulse-to-pulse variations in the laser parameters.

The inventors have discovered that the modified zone etches faster relative to the unmodified material in buffered oxide etchant (10:1 BOE), although hydrofluoric acid (HF) can also be used.

Figure 2A:
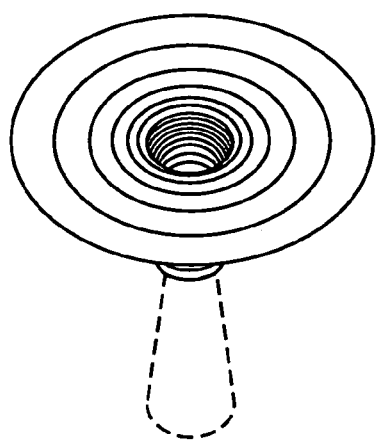
FIG. 2(a) illustrates how a modified zone selectively chemically etches to form a hole from the tip side of the conical structure.
Figure 2B:
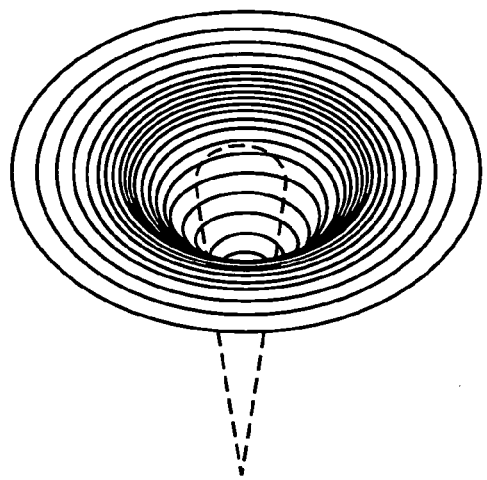
FIG. 2(b) illustrates how a modified zone selectively chemically etches to form a hole from the base side of the conical structure.
Figure 2C:
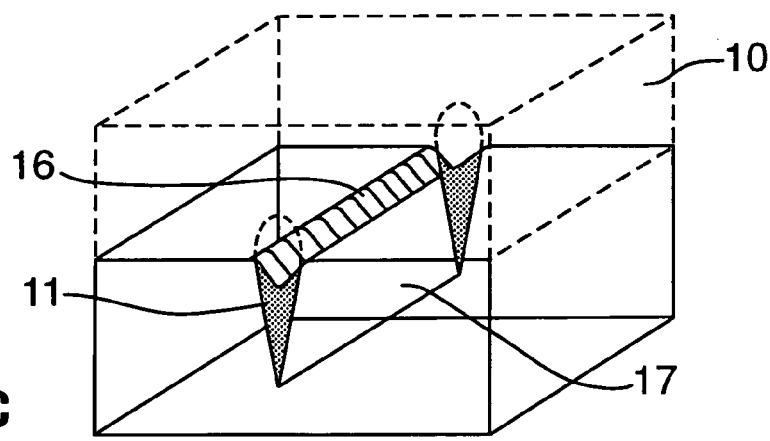
FIG. 2(c) illustrates the steps in the fabrication of a channel with adjoining waveguide in a glass block when etching is done from the side of the base of the conical structure.

FIGS. 1a, 1b, 2a, and 2b show the effects of firing femtosecond lasers pulses at a single location. FIGS. 2(c) and (d) show the effects of translating the focus of the pulses laterally through the bulk dielectric.

If the femtosecond laser beam is focused through the top surface of a dielectric with a dosage to produce a stage I shaped conical structure and if the dielectric is etched from the top surface, the etching process tries to open up a hole laterally However the increasing size of the conical structure at greater depth compensates for the lateral etching to produce a cylindrical hole.

However, if the femtosecond laser beam is focused through the top surface of a dielectric with sufficient dosage to create either a stage II or stage III shaped conical structure 11 (as shown in FIG. 1(b)) just below the top surface, and if the dielectric material is etched from the top surface, the etching process results in a hole which exceeds the diameter of the base of the cone. As etching proceeds the tapered modified zone will act to produce a strongly tapered hole rather than a cylindrical hole. This is shown in FIG. 2b. Such highly tapered holes are of limited use for 2-D photonic crystal applications and are non-ideal for most other applications. They can, however, find application in microfluidic applications, for example, to form nozzles.

In FIG. 2(c), the focus of the laser beam is translated so that the successive tapered zones 11 produce a wedge-shaped modified zone 15. If this structure is etched from the top, a V-shaped groove 16 connected to a wedge-shaped waveguide 17 is formed.

In the case of top etching, there is also risk of disruption to the uniformity of the modified region if the focused laser beam at the surface is of sufficient intensity to cause surface damage. It has also been observed that laser beams focused just below the top surface (a few μm) can modify the material back to the top surface. This occurs without any catastrophic surface damage, but in such a manner that it is very difficult to uniformly and efficiently etch the dielectric material covering the desired modified region.

In the preferred embodiment of the invention, the laser writing procedure involves focusing the laser beam deep enough inside the material so that the laser intensity near the top surface is too low to modify the surface. The top of the modified zone should be at least 20 μm below the top surface. The material should be etched from the bottom surface. It is preferable to position the tip of the conical structure just above the bottom surface, preferably a few microns above the bottom surface, so as to minimize the thickness of material to be etched. This results in better selective etching of the modified region. In cases where the sample thickness exceeds the working distance of the focusing optics the tip of the conical structure will have to be positioned at a known distance from the sample surfaces and the sample can either be cut and polished or just polished to put the bottom surface close to the conical tip.

The etchant acts on the "narrow tip" region first which it tries to open both in the direction of the conical structure and laterally into the unmodified material. As the etching proceeds the emergence of the progressively wider modified zone compensates for the lateral etching to produce a hole (in the case of a static laser) or channel 18, which has generally straight sidewalls as shown schematically in FIG. 2(a) and FIG. 2(d))respectively. The channel adjoins region 19 having modified etch and refractive index properties and which serves as a waveguide adjoining the channel 18.

Figure 3A:
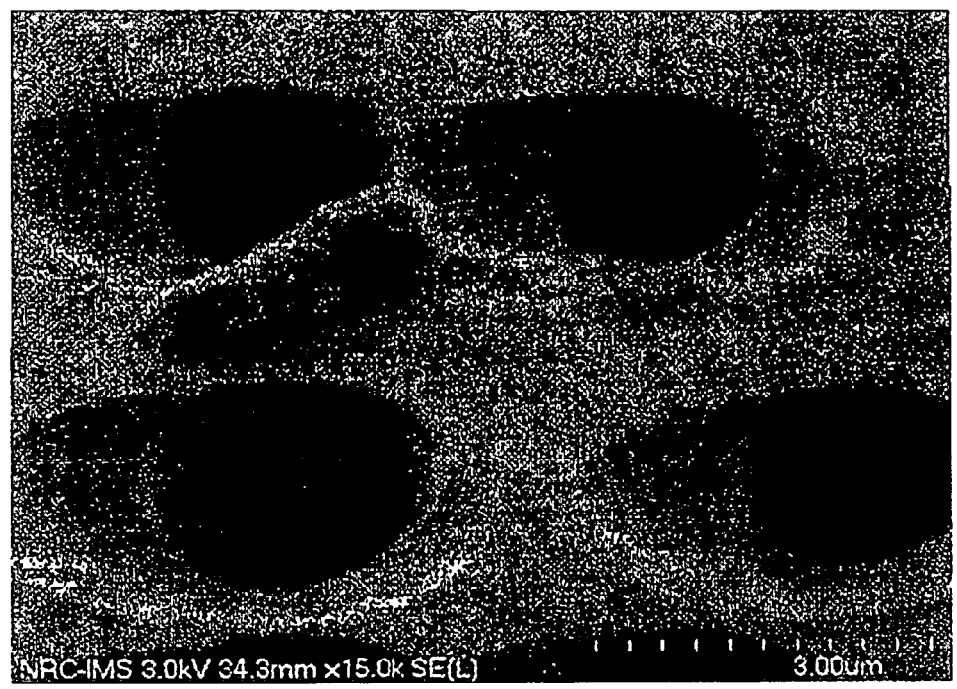
FIG. 3(a) is a SEM image of femtosecond written selectively chemically etched holes in silica glass.

The narrow width of the tapered region of the conical shaped modified zone makes it possible to produce holes or channels 18 having a width as small as 300 nm in undoped silica glass. The inventors have also demonstrated that two sub-micron wide holes can be produced as close as 1.4 μm apart, opening up the possibility of creating very high hole densities. FIG. 3(a) shows an SEM image of part of a 5×5 array of some of discrete holes that have been made in the static case, i.e. without translation of the laser pulses. The holes are clean and appear to have steep sidewalls. The channel in the translation case has a width approximately equal to the diameter of the holes.

For stage I weakly modified conical structures which show tapering on the top as well as on the bottom of the conical structure (FIG. 1(b)) some compensation for the lateral etching will be provided when etching from the top surface although only for shallow holes.

Approximately 4000 shots at ≈750 nJ/shot were needed to modify the glass for each hole. It is therefore possible to make arrays of such holes in minutes. When the laser beam is translated parallel to the bottom surface it has been found that the accumulated energy dosage (i.e. energy per pulse times the number of pulses) delivered to the dielectric material per micron of translation needs to be about $10^{-5}$ to $10^{-2}$ Joules.

Figure 3B:
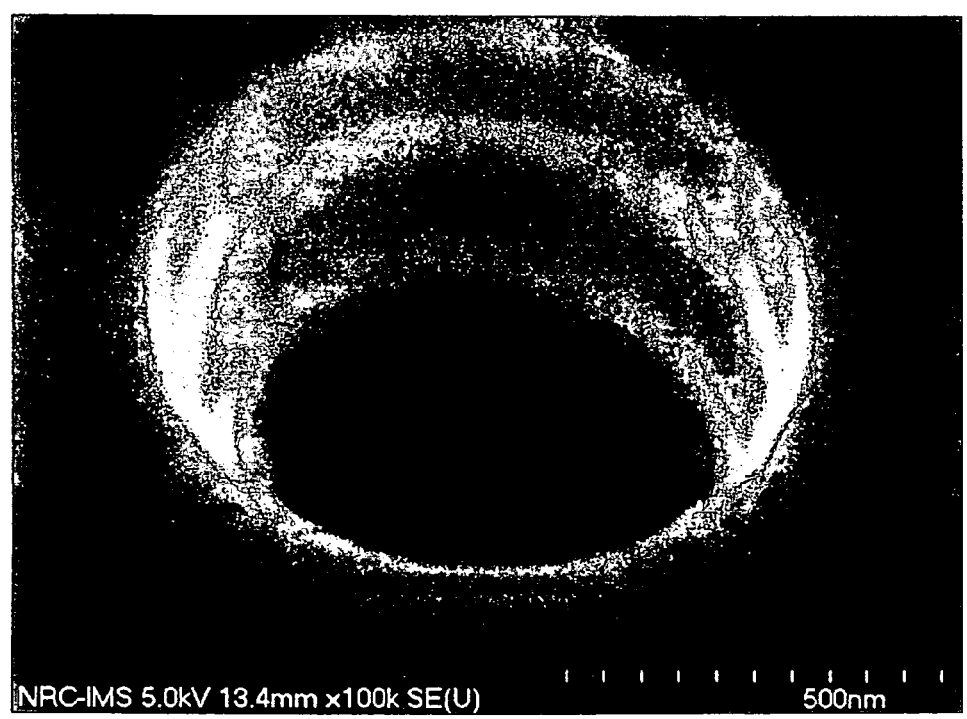
FIG. 3(b) is a SEM image of a hole produced using a NA=0.45 microscope objective to focus the femtosecond laser light.

In order to make deep (>2 μm), sub-micron diameter holes, which might be of interest for 2-D and 3-D photonic crystal applications, the laser dosage must be chosen to provide sufficient material modification in the tapered region to obtain a high degree of selective etching. The numerical aperture (NA) of the focusing optics can also be chosen to provide sufficient taper length (a lower NA will result in a longer conical taper) to be able to produce both a deep and narrow hole after etching. Typically the NA used is about 0.7, however very nice sub-micron wide holes can be made, for example, using an NA=0.45 lens as shown in FIG. 3(b). The use of modest NA long working distance focusing optics also permits large samples (cms) to be used and still be able to focus to the bottom surface. It becomes progressively more difficult to produce a long (>5 μm) uniform undamaged highly tapered zone as the numerical aperture of the lens increases beyond≈0.9.

The taper angle of the conical structure must be sufficiently large to compensate for the lateral etching in order to make steep sidewall holes. However the rate of lateral etching will depend inversely on the rate of selective chemical etching i.e. greater selective etching in the modified zone will result in less lateral etching for a given hole depth. It is therefore important to achieve highly selective etching. The dielectric material can be doped or chosen from a number of multicomponent glasses of from photosensitive glasses to increase the degree of material modification and/or to permit more rapid etching relative to the unmodified region. This will result in narrower deeper holes. A thick doped layer (e.g. 20–30 μm) or component glass or photosensitive glass layer can also be deposited onto the bottom of say silica glass to achieve the same purpose.

The holes can be made at various angles with respect to the bottom surface by adjusting the angle of incidence of the conical structure.

It is also possible to increase the laser dosage in selected locations to create easy to etch holes/slots to serve as reservoirs for the acid to enter into the bulk material to permit etching of conical structures, which are e.g. parallel to the bottom surface. In this way holes or channels can be created along three orthogonal axes. This is a necessary feature to make complicated 3-D photonic crystal structures.

Figure 4:
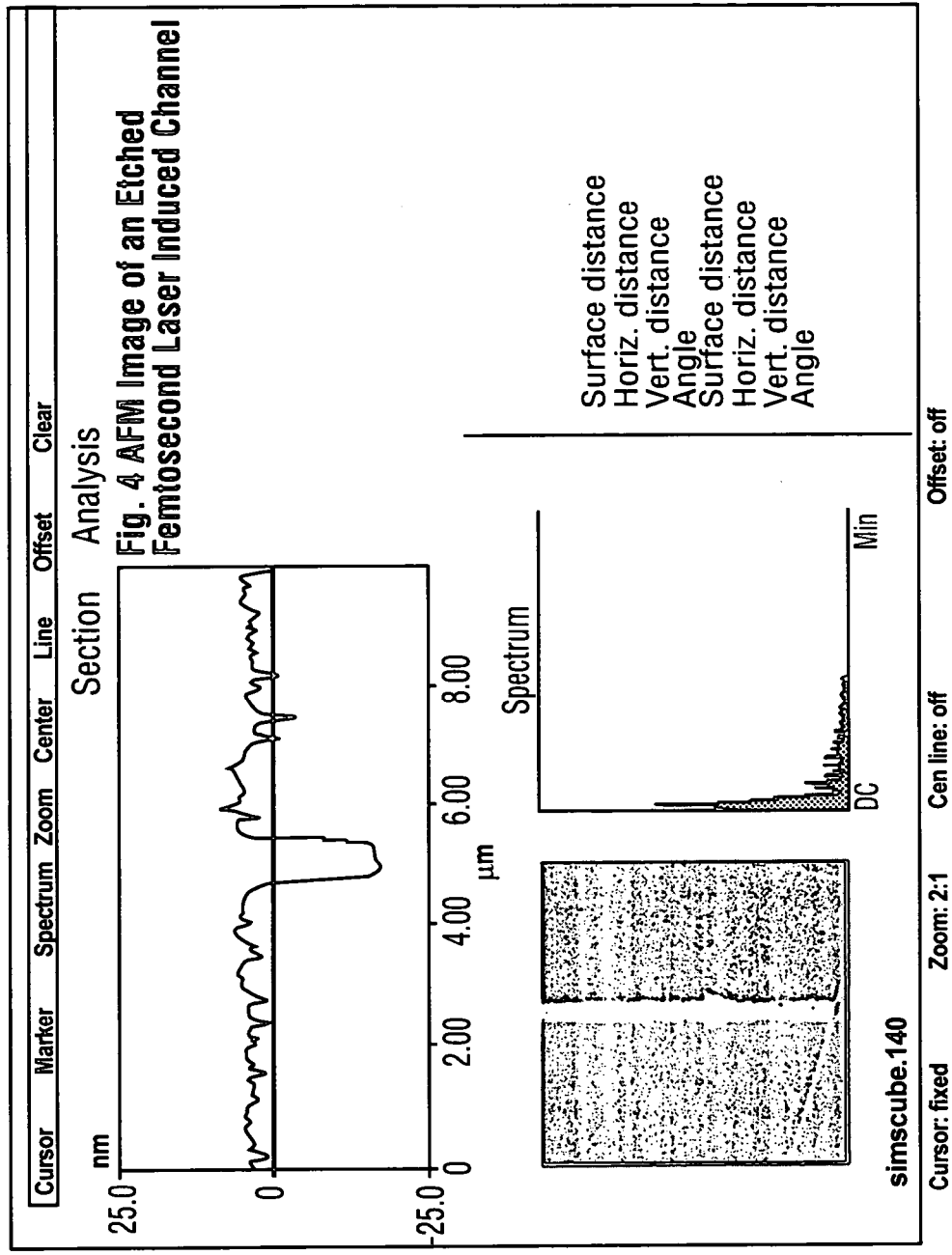
FIG. 4 is an AFM image of an etched femtosecond laser induced channel.

If the focus of the femtosecond laser beam is translated close to and parallel to the bottom surface of a silica wafer sample, for example, it is possible to produce a narrow sub-micron channel with steep sidewalls after etching as shown in FIG. 4. If the etching process is stopped before entering into the top part of the cone, then the remaining modified structure can act as a waveguide with glass surrounding the core on all sides except one which is normally air (FIG. 2(d)). Another medium can be put in the channel 18 provided it has an index of refraction lower than that of the glass and that it assists in guiding light.

If the irradiated zone had been near the top surface of the dielectric sample then the waveguide left after etching would include the narrower sub-micron tapered region and would not be as satisfactory for light propagation (FIG. 2(b)).

The width of the waveguide adjoining the channel is≈1.7 μm, which is satisfactory for the propagation of visible light but not near-infrared light (i.e. for core/clad index of refraction differences≦0.01). Two or more side-by-side conical structures are required to sweep out a larger waveguide width to transmit λ=1.5 μm light. These structures are formed side-by-side at each location prior to translation of the focus of the laser pulses laterally through the material, i.e. in a direction perpendicular to the direction of the translation direction of the laser pulses. The number of side-by-side zones can be adjusted to create tapered channels or waveguides. A wider more symmetric waveguide can also be produced using aspherical optics (e.g. combination of a microscope objective an angled (with respect to the scan angle) cylindrical lens) as shown in international application published under the Patent Cooperation Treaty (PCT) WO 02/16070A2.2002 entitled "Methods for creating optical structures in dielectrics using controlled energy deposition" by O. L. Bourne, D. M. Raynor, P. B. Corkum, M. Mehendale, and A. Naumov.

Figure 2D:
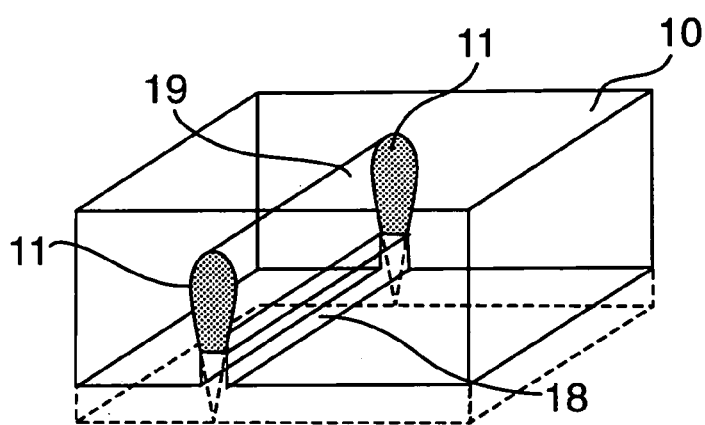
FIG. 2(d) illustrates the situation in a glass block when the etching is done from the tip side of the conical structure.

The waveguide shown in FIG. 2(d) is a very special waveguide since it automatically tracks the etched channel, which can of course be formed into complicated patterns. Light can be evanescently coupled from the waveguide into the channel 18 which could contain various liquids or biological materials for spectroscopic analysis. The evanescent coupling of light into the channel is very sensitive to the index of refraction of the material and can be used as a means of determining its value.

The etched channel can partially filled with a polymer, a thermo-optical material, a metal, biological material, fluids or other substances which can affect the propagation. An example for a very straightforward application of the channel and adjoining waveguide is as an index of refraction monitor for fluids. The transmission of light down the waveguide will be strongly influenced by the index of the fluid cladding layer.

Instead of translating the focus of the femtosecond laser beam along the bottom surface, the beam can be moved vertically within the material toward the top surface. The sample can then be chemically etched from the bottom surface to produce a small hole with an optical waveguide sitting right on top of it. Furthermore, the focused laser beam can be raster scanned to produce a larger modified zone resulting in a larger diameter hole (e.g. 10–20 μm). Of course this technique can be used to produce dense arrays of such holes each with its own waveguide.

The conical structure shown in stage I of FIG. 1(b) can be written with its sharp lower tip approximately 10 μm from the bottom surface. When the femtosecond laser beam is translated parallel to the bottom surface (or the sample translated) it produces a waveguiding structure. At various locations during the translation the laser dosage can be increased producing a structure shown as stage III in FIG. 1(b). The tip of this extended structure would be just above the bottom surface. It is also possible to withdraw the laser beam vertically off the surface to create a vertical waveguide.

After chemical etching a series of channels and/or holes will be created in the heavily dosed regions while no channel/holes will be produced in the low dosage regions. This procedure results in a series of holes adjoining a horizontal waveguide and attached if desired to a series of vertical waveguides. It provides the capability of simultaneously delivering light via the horizontal waveguide to all the holes or holes. Light emitted from material in the holes can then be detected using each vertical guide above the holes.

In order to make precise holes and channels it is necessary to keep the focused laser beam the same distance above the bottom surface as the sample is translated. This can be achieved in a number of ways including optically imaging the emerging plasma as the laser beam just penetrates the bottom surface; creating a small laser damage spot on the bottom surface with the femtosecond laser (The reflected femtosecond laser signal from the spot can be used to set the distance of the lens to the bottom surface); using a lens to focus a collimated femtosecond laser beam onto the bottom surface of the sample and adjusting the lens to surface distance to keep the back-reflected beam also collimated (When the collimated beam is focused n to a CCD it will result in the minimum spot size); and interferometry.

The above methods are not restricted to glass but can also apply to other materials such as sol gels and transparent or semi-transparent polymers. In the case of polymers chemical etching with acids such as HF would be replaced with appropriate organic solvents.

The structures described so far are structures that can be made from focusing an essentially Gaussian shaped femtosecond laser beam into a dielectric material. It is also possible to use various masks upstream of the focusing optics, or to combine multiple beams, or to use aspherical optics to modify the shape of the input beam profile and to optimize the shape of the modified region. Structures with precisely controlled, sub-micron separations can be made in this way.

In order to make smooth (structure variations <100 nm) walled channels it is preferable to use an unpolarized laser beam or to scramble a linear polarized beam by rapidly (e.g. 10 kHz) rotating the polarization direction.

The following examples show how various materials contained in the channels and holes can be integrated with the adjoining optical waveguides to perform useful functions. The examples also demonstrate how devices can be made which benefit from the capability of making precise structures in dielectrics.

EXAMPLE 1

Fabrication of Photonic Components: A Variable Optical Attenuator

Figure 5:
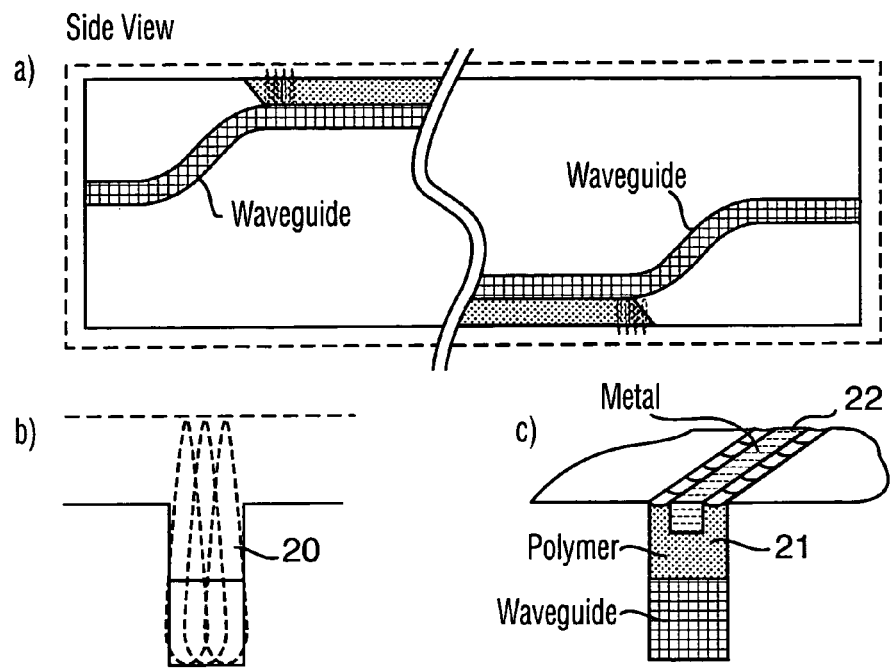
FIGS. 5a to 5c are schematic illustrations of a variable optical attenuator.

The combination of a channel with an adjoining waveguide can be used to fabricate a temperature controlled variable attenuator for telecom applications as shown in FIGS. 5a to 5c. In this application a channel 20 created by femtosecond laser writing followed by selective chemical etching (FIG. 5(b)) is partially filled with a polymer 21 (FIG. 5(c)) whose index of refraction is less than that of the waveguide core and which has a temperature dependent absorption at e.g. $\lambda=1.5$ μm. The polymer 21 could also be from a class of polymers with large thermo-optical responses leading to large index of refraction changes as the polymer is heated. The index gradients can be made sufficiently large to deflect light out of the waveguide.

A metal coating 22 is subsequently deposited on top of the polymer and the entire surface is polished to remove the metal and polymer everywhere except in the channels. The small cross-sectional area metal channel 22 serves as a resistive heating element to adjust the temperature of the polymer.

Light launched into the left side of the device experiences attenuation in the top portions of the waveguide containing the polymer cladding. In this case the channel 20 has been written by focusing the femtosecond laser light through the bottom surface to finish just under the top surface. In the second half of the device the waveguide path can be written so that it is near the bottom surface (i.e. laser writing from the top) so that the light distribution at the bottom of the waveguide now experiences attenuation producing an overall symmetric attenuation of the waveguide mode. If the light distribution entering the device is asymmetric in the direction perpendicular to the base of the polymer channel then the controlled independent heating of the top and bottom polymer channels can be used to restore symmetry. Arrays of such variable attenuators can be made on a single silica chip. The attenuators can be made into a series of optical switches by turning the heating elements on and off on top of each polymer channel.

EXAMPLE 2

Microfluidic Applications on a Silica Chip

The method in accordance with the invention permits the production of precise channels, which can be tapered and formed into complicated patterns such as mixing chambers for chemistry on a chip experiments.

The value of these narrow channels for chemistry on a chip experiments is enhanced since with each channel there is an adjoining optical waveguide, which can couple light into or out of the channel. One could also use arrays of micron-sized holes to trap very small droplets of liquid for analysis.

It is also possible to partially coat the interior of the channels/holes with metal. The metal is then removed everywhere except in the channels/holes by polishing. Laser radiation delivered through the waveguides attached to the channels/holes can be absorbed by the metal to control the temperature of samples placed in such channels/holes. The laser radiation can also be used heat the samples sufficiently rapidly to eject the material from the holes.

EXAMPLE 3

Biological Sensing Applications on a Chip

Very small volumes of biological material can be inserted into the narrow channels where it can be interrogated by light traveling in the waveguide adjoining the channel.

There are also biological sensor applications for holes and their vertically connected waveguides. For example, biological specimens could be inserted into the holes. An entire array of holes could then be irradiated with UV light and the fluorescence from each specimen could be guided by its own waveguide for selective detection. Alternatively holes containing a sample could be individually irradiated or sampled through its own waveguide.

It is also possible to use light traveling in a horizontal waveguide, which has no adjoining channel but instead interfaces with a series of holes, to simultaneously irradiate material contained in all of the holes. Light emanating from each hole e.g. fluorescence, can be detected using the dedicated vertical waveguides adjoining each hole.

EXAMPLE 4

Insertion of Materials between Interconnected Waveguides for Telecom Applications It will be appreciated that the method of the invention makes it possible to create a hole (FIG. 3) at the termination of a waveguide i.e. at the glass/air boundary. The hole diameter can have approximately the same dimensions as the waveguide. Arrays of such waveguides can be written inside a block of dielectric and terminated in such holes. The holes can then be filled with material which could alter the intensity, polarization or other properties of the light propagating through the holes to interconnect with an external set of waveguides butted to the holes.

EXAMPLE 5

Fabrication of Wires and Mirrors

This application takes advantage of the capability of producing smooth and steep side-wall channels or holes. If the etched channels 20 shown in FIG. 5(b) are coated with just a metal layer and then polished to remove the metal everywhere except in the channels, it is possible to make wires. The wires could be used to provide electrical connections for integrated optical components fabricated on the surface or just below the surface into the bulk glass. Metallization of the channels 20 followed by polishing can also be used to make electrodes for biological screening experiments.

EXAMPLE 6

Fabrication of RLC Circuits and an Electro-optical Modulator on a Dielectric Chip This application takes advantage of sub-micron resolution laser writing and chemical etching to make small components. When the interior of two parallel closely separated channels are coated with a metal and the metal is removed everywhere except in the channels they can act as a capacitive element. It is also possible to produce oscillatory variations to the channel pattern in the plane of the bottom surface of the dielectric to produce an inductive element. Control over the channel dimensions on a micron scale also permits the fabrication of resistive wire elements as discussed in example 5. The construction of miniature RLC components could be useful for detector arrays or other optical components on a dielectric chip.

Figure 6:
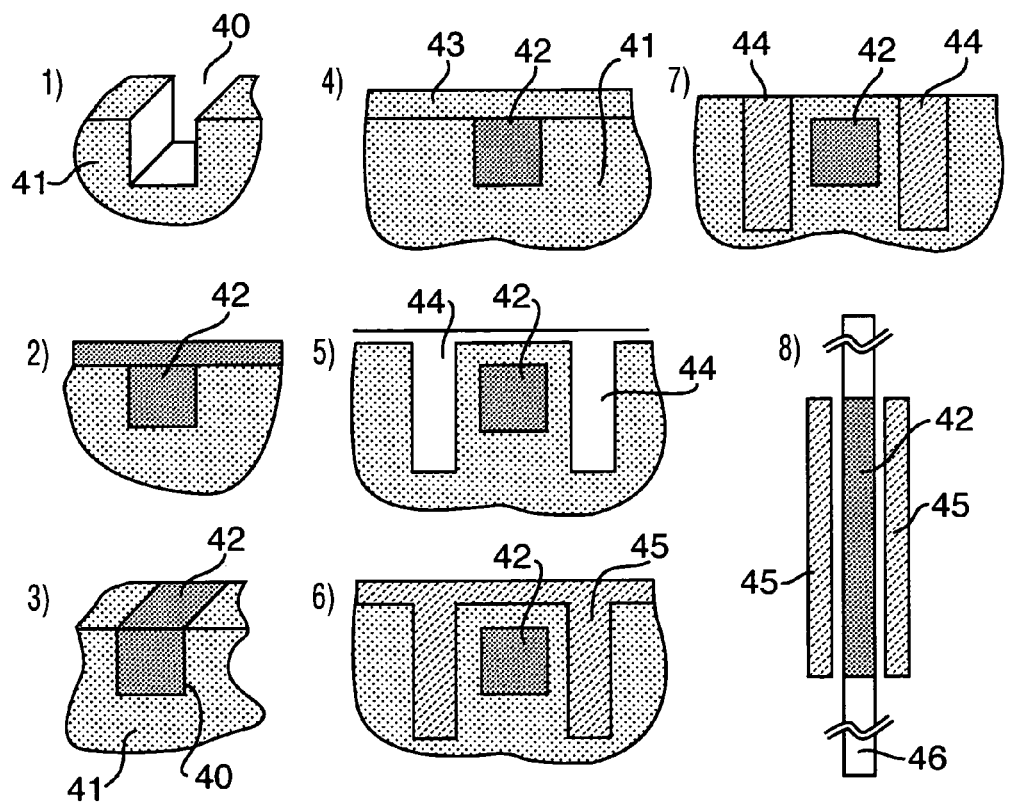
FIG. 6 illustrates the steps in making an electro-optic modulator.

An example of such a component is an electro-optical modulator. Such a modulator could be formed by putting an appropriate electro-optical material into a channel sandwiched between two conductive plates and applying an external voltage. This can be accomplished using the following steps, which are shown schematically in FIG. 6:

1. The femtosecond laser plus selective chemical etching technique is used to create a channel 40 in a silica wafer 41 with cross-sectional dimensions typical of a near-infrared waveguide
2. Electro-optical material 42 is deposited to fill the channel 40.
3. The wafer is polished to remove the electro-optical material 42 everywhere except in the channel 40.
4. The wafer is then overcoated with a thick layer of silica 43 (preferably doped to enhance selective chemical etching).
5. The femtosecond laser plus selective chemical etching technique is used to create two side channels 44 close to the channel filled with modulator material 42.
6. The wafer is metallized to fill the two side channels 44 with metal 45.
7. The wafer is polished to remove the metal 45 everywhere except in the two channels. Electrical connection can then be made to the side channels 44.
8. Femtosecond laser writing is used to produce waveguides 46 to connect to either end of the electro-optic waveguide.

EXAMPLE 7

Fabrication of an All Optical Switch

Figure 7:
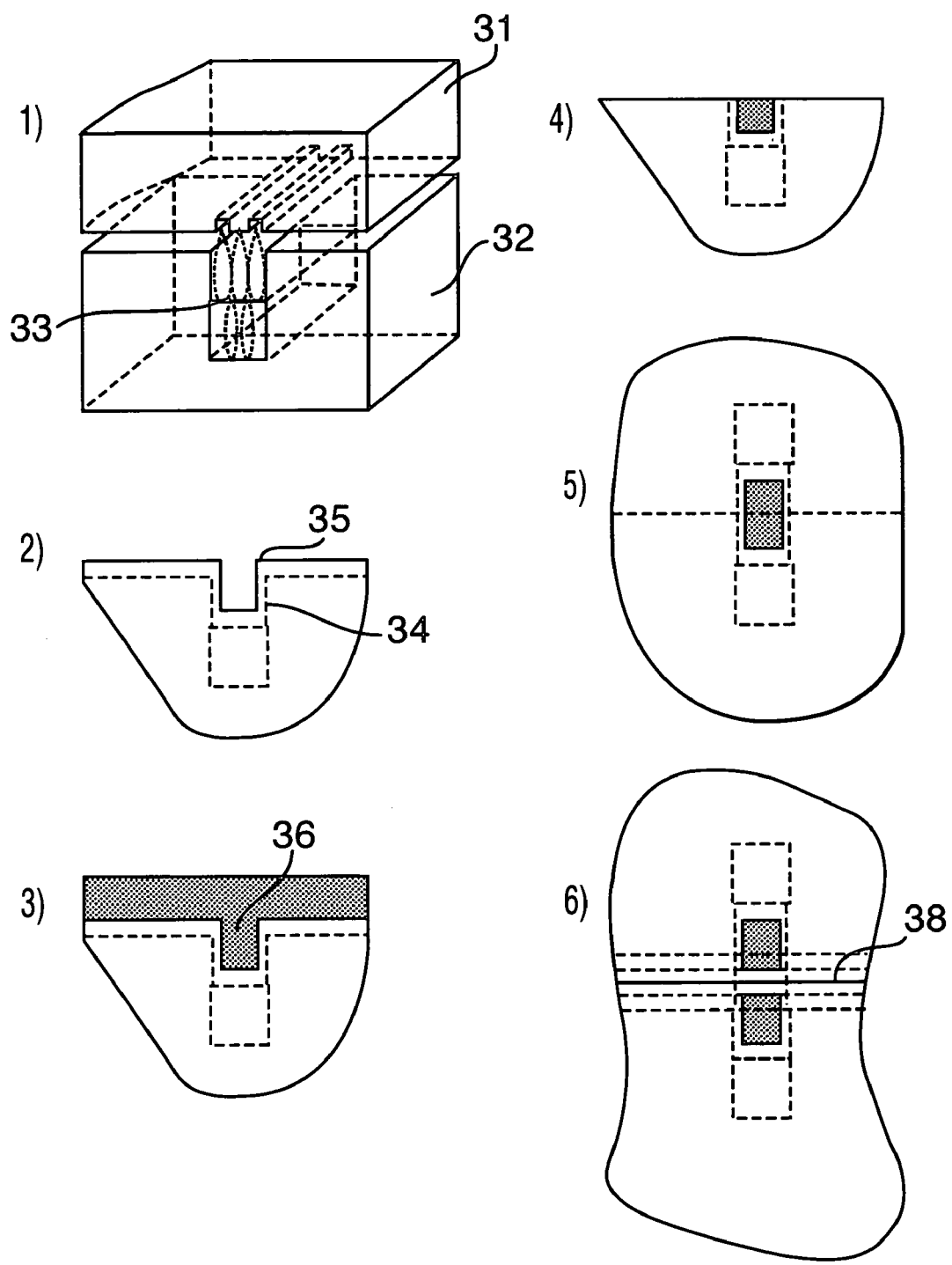
FIG. 7 illustrates the steps in the fabrication of an all optical switch.

The all optical switch consists of three parallel closely coupled waveguides in which the core of the central guide is doped with a gain medium such as erbium (Er). As understood by persons skilled in the art, an "all optical" switch is one in which the switching of light is controlled by light. When this waveguide is optically pumped (e.g. at 980 nm) it exhibits gain at telecom wavelengths. The gain results in the controlled and efficient switching of light from one outside guide to the other. The closely coupled waveguides can be fabricated using the method in accordance with the invention and according to the following steps, which are shown in FIG. 7: Two blocks of glass 31, 32 are temporarily bonded together. Femtosecond laser pulses are focused through the bottom surface of the lower block 32 to just below the interface between the blocks. The femtosecond laser can be scanned across the block to enlarge the modified zone 33 as shown in FIG. 7. The focused light is also allowed to just enter the base of the second block to mark the perimeter of the modified zone. This process is repeated at various locations to produce arrays of modified zones 33.

The blocks are then separated and the bottom block is chemically etched to create a series of channels each with its own optical waveguide adjoining it. The second block 31 can be irradiated with femtosecond laser pulses in the marked regions to create identical modified zones and channels after etching.

The channels 34 are then partially filled with silica glass 35. Er-doped (erbium) glass 36 is deposited into the remaining portion of the channel 34. The top layers of Er-doped glass and silica are then removed, e.g., by polishing, to produce a two waveguide structure.

The two blocks 31, 32 can be recombined as shown at step 5 and then aligned so that the sets of waveguides overlap. This produces the three waveguide geometry.

A silica layer 38 can be added after step #4 to produce a four element waveguide structure shown in FIG. 7.

The above method of fabrication has the following advantages over using femtosecond laser pulses to directly write all the waveguides into a multilayered slab containing an Er-doped layer. Firstly, it is presently not clear whether it will be possible to use femtosecond laser pulses to write a high quality waveguide in highly doped Er-glass. Furthermore the spacing between all the waveguides is critical for switching since it determines the degree of evanescent coupling between the guides. Fabrication with the combined femtosecond laser irradiation and chemical etching produces waveguides in which the distance between the doped and undoped guides is determined by the thickness of the silica layer (i.e. step #2), which can be very accurately controlled.

Figure 8:
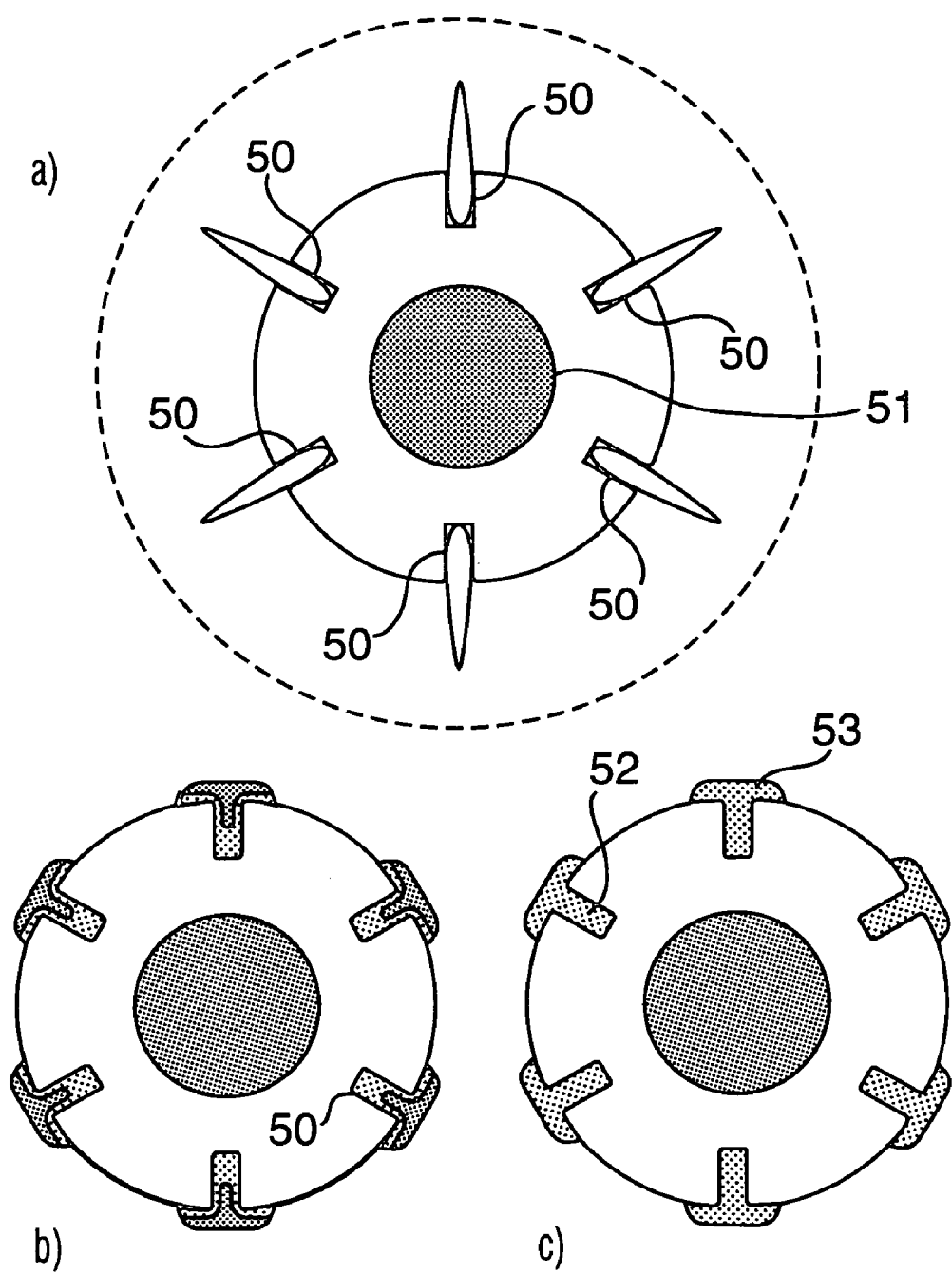
FIGS. 8a to 8c show the steps in the fabrication of a dynamic polarization mode dispersion compensator in a fiber.

It will be appreciated by one skilled in the art that the method in accordance with the invention is not restricted to use with blocks, slabs or wafers of dielectric material, but it also applicable to other geometries, such as fibers and capillary tubes. For example, the femtosecond laser beam could be focused from either side and down the length of a single-mode fiber to produce high index of refraction regions near the fiber core defining a preferential direction across the core to create a polarization maintaining function. After chemical etching, narrow slots or holes 50 could be produced radially like spokes of a wheel around the fiber core 51 as well as down the length of the fiber as shown in FIG. 8. The narrow slots could be placed close to the fiber core and yet still be able to define a fairly precise radial direction. These structures could be filled with various photonic related materials such as the temperature sensitive absorbing or thermo-optic polymers, which were discussed in example 1. Metal coating of the fiber impregnated with such arrays of polymer channels would result in a fiber version of the variable optical attenuator described in example 1.

It is desirable to be able to control the temperature of the material in each of the etched channels. However, in the case of the fiber geometry, polishing the curved surface to remove the metal everywhere except in the channels is difficult. It will probably be necessary to use a technique such as femtosecond laser ablation to remove the metal between the slots.

These types of structures can also be used to make a dynamic polarization dispersion compensator for telecom fibers. Femtosecond written waveguides can be used as multiple taps to sample the light beam propagating down the fiber. This signal can be analyzed by a polarimeter to obtain polarization information on the light, which can be sent to a polarizing transformer to correct for polarization mode dispersion and polarization dependent loss. The femtosecond written and chemically etched conical structures described above and shown in FIG. 8(a) can be used to make such polarization corrections. Arrays of etched channels 50 containing a thermo-optic polymer 52 covered with a metal 53 to form a resistive element, which can be independently heated, provide a means of dynamically changing the index profile in the core/cladding region (FIG. 8(b)). It might also be possible to just use metal in the channels and depend on local thermally induced stress gradients to provide polarization mode dispersion compensation (FIG. 8(c)).

The narrow channels described above can also be used to enhance a fiber's sensitivity as a strain or temperature sensor as described by Y. Jiang, S. Pang and Y. Cui, Proc. of SPIE, 3491, pp. 897–901, 1998, the contents of which are herein incorporated by reference.

There are also a number of possible applications which could utilize the high density of small diameter holes coupled to dedicated waveguides feature of the described technique, especially when the modified zone tapers in both directions so as to produce generally cylindrical holes in the dielectric material.

(1) Phosphors can be deposited into the holes for light conversion e.g. infrared to visible.

(2) Some metal can be deposited into the holes. The holes are then filled with biological or chemical material and the light transmitted down the dedicated waveguide is used to heat the metal and therefore the sample in a controlled way. The sample could also be heated to the point where it is ejected from its micron sized hole onto a receiving template. Similar things can be done without the metal coating but would require that the sample strongly absorb the laser light.

(3) The use of the technique to make controlled distributions of small diameter closely spaced holes for photonic crystal applications e.g. to assist light in making sharp turns.

(4) The top surface of a slab containing arrays of waveguides with bottom surface holes can be backlit and then the light emanating out of the hole precisely indicates the position of the hole to a vision system. Biological material can then be precisely dropped onto the hole. Conversely when a reader of optical information, e.g. fluorescence, from the sample, e.g. DNA, scans the surface the backlit hole will allow it to know it is over the biological specimen. This application is satisfying since it uses both the small hole and also the adjoining waveguide.

While many embodiments of the invention have been described by way of example, it will be appreciated by one skilled in the art that many other variations of the invention are possible within the scope of the appended claims.

We claim:

1. A method of fabricating a microstructure in a transparent dielectric material, comprising:
focusing femtosecond laser pulses having an energy-per-pulse of less than 3 µJ into said dielectric at a sufficient peak power, intensity and energy dosage to create a highly tapered modified zone having a length: width ratio≧4:1 with modified etch properties, said tapered modified zone having at least one tip having a diameter less than about 250 nm, which is less than the wavelength of the laser pulses; and
selectively etching into said modified zone.

2. A method as claimed in claim 1, wherein said modified zone has the shape of a single conical structure with a base.

3. A method as claimed in claim 2, wherein the diameter of said base is greater than about 1 µm.

4. A method as claimed in claim 2, wherein selective etching takes place from the tip of the modified zone so that as said selective etching proceeds longitudinally into said modified zone, the progressively increasing width of said modified zone compensates for lateral etching occurring at said tip so as to produce a generally cylindrical hole at least partially extending into said modified zone.

5. A method as claimed in claim 1, wherein said modified zone is a double conical structure with tips extending away from a base region, and wherein selective etching takes place from one of said tips so that as said selective etching proceeds longitudinally into said modified zone, the progressively increasing width of said modified zone compensates for lateral etching occurring at said tip so as to produce a generally cylindrical hole at least partially extending into said modified zone.

6. A method as claimed in claim 2, wherein said selective etching takes place from the base of the modified zone to create a tapered hole.

7. A method as claimed in claim 4, wherein said laser pulses are focused deep into said bulk dielectric so that the laser intensity near a top surface of said bulk dielectric is too low to modify said top surface.

8. A method as claimed in claim 5, wherein said tip of the modified structure is positioned to be between 0 and 10 µm above a bottom surface of said bulk dielectric so as to minimize the thickness of material that needs to be etched to reach said modified zone.

9. A method as claimed in claim 7, wherein the laser pulse energy is about 10 nJ to 1 µJ, the laser pulse duration is about 10 fs to 100 fs, and the accumulated laser energy dosage delivered to the dielectric to create a single modified structure is about $10^{-5}$ to $10^{-2}$ Joules.

10. A method as claimed in claim 1, wherein said laser pulses are focused into said dielectric with focusing optics that has a numerical aperture selected to produce a tapered zone having a taper length sufficient to produce a hole having a predetermined length.

11. A method as claimed in claim 1, wherein said modified zone has a generally inverted conical shape.

12. A method as claimed in claim 11, wherein the angle of incidence of said laser pulses is non-normal to said top surface to create a conical structure having an axis lying at an angle to said top surface, whereby a hole made from said conical structure extends at an angle to said top surface.

13. A method as claimed in claim 1, wherein said bulk dielectric is doped or consists of component glasses or photosensitive glass to increase the amount of material modification caused by said laser pulses and/or to increase the etch selectivity of the modified region.

14. A method as claimed in claim 1, wherein a thick doped layer or layer of multicomponent glass or a layer of photosensitive glass is formed on the bottom of said dielectric to increase the amount of material modification caused by said laser pulses and/or to increase the etch selectivity of the modified region.

15. A method as claimed in claim 1, wherein said tapered modified zone has an upper portion and a lower portion, said top portion tapering in the opposite direction to said lower portion.

16. A method as claimed in claim 15, wherein selective etching takes place from the tips of said upper and lower portions so that as said selective etching proceeds longitudinally into said modified zone, the progressively increasing width of said modified zone compensates for lateral etching occurring at said tips so as to produce one or more generally cylindrical holes in said dielectric material.

17. A method as claimed in claim 16, wherein phosphors are deposited into said hole(s) for light conversion.

18. A method as claimed in claim 16, wherein metal is deposited into said one or more holes, and said one or more holes are filled with biological or chemical-material, so that light can be transmitted down a dedicated waveguide to heat the metal and therefore the sample in a controlled way.

19. A method as claimed in claim 16, wherein said modified zones are arranged in controlled distributions to make small diameter closely spaced holes for photonic crystal applications.

20. A method as claimed in claim 16, wherein the top surface of a slab containing arrays of waveguides with said holes on the bottom surface holes is backlit so that light emanating out of the holes precisely indicates the position of the holes to a vision system.

21. A method as claimed in claim 4, wherein the focus of said laser pulses is translated through said material so as to extend said modified zone laterally, said laterally extended modified zone then being selectively etched to provide a lateral channel in said bulk dielectric.

22. A method as claimed in claim 21, wherein two or more of said tapered modified zones are formed side-by-side in said bulk dielectric in the width dimension of said channel.

23. A method as claimed in claim 22, wherein the number of side-by-side zones is adjusted to create tapered channels or waveguides.

24. A method as claimed in claim 21, wherein the focus of said laser pulses is translated parallel to a bottom surface and with the position of the modified tip about 0 to 10 µm from a bottom surface of said bulk dielectric.

25. A method as claimed in claim 21, wherein a wider portion of said translated tapered modified zone is left unetched to serve as a waveguide adjoining an etched channel.

26. A method as claimed in claim 25, wherein the laser power and dosage are set at a level sufficient to create a tapered modified zone extending down toward the bottom surface only at specific locations as the focus of the laser pulses is translated through the bulk dielectric, and between said specific locations the power and dosage is reduced so as to create a modified zone of reduced vertical dimension, whereby after selective etching spaced vertical holes are coupled to a waveguide consisting of modified material extending laterally across said bulk dielectric.

27. A method as claimed in claim 25, wherein said etched channel is partially filled with a material whose properties affect the propagation of light in the channel.

28. A method as claimed in claim 27, wherein said etched channel is partially filled with a polymer whose refractive index changes with temperature, and a metal coating is applied on top of said polymer to form a variable attenuator.

29. A method as claimed in claim 27, wherein said etched channel is partially filled with a material selected from the group consisting of: a polymer, a thermo-optical material, a metal, biological material, fluids or other substances which can affect the propagation.

30. A method as claimed in claim 1, wherein the focus of said laser pulses is displaced vertically in said bulk material to create a vertically extending modified zone, and said modified zone is etched from the bottom surface leaving the top portion unetched so as to provide a hole terminating in a vertical waveguide.

31. A method as claimed in claim 30, wherein the translation is temporarily stopped at determined locations in order to increase the laser dosage at said determined locations.

32. A method as claimed in claim 31, wherein the focus of said laser pulses is displaced vertically at said determined locations so that after etching a horizontal waveguide is attached to a series of vertical waveguides.

33. A method as claimed in claim 1, wherein a phase-amplitude mask is placed in said laser beam to change the field distribution in the focal volume of said laser beam to vary the shape of said modified zone.

34. A method of as claimed in claim 21, wherein metallic material is deposited into said channel to create wire or an electrode.

35. A method as claimed in claim 34, wherein said metallic material is deposited over the surface of said bulk dielectric, and subsequently removed from said surface to leave said metallic material remaining only in said channel.

36. A method as claimed in claim 4, wherein said tapered modified zone is selectively etched with a solution comprised of hydrofluoric acid.

37. A method as claimed in claim 4, wherein said tapered modified zone is selectively etched with a solution comprised of BOE (buffered oxide etchant).

38. A method of fabricating a microstructure in a transparent dielectric material having a bottom surface, comprising:

focusing femtosecond laser pulses having an energy-per-pulse of less than 3 µJ into said dielectric at a sufficient peak power, intensity and energy dosage to create a highly tapered modified zone having a length:width ratio $\geq 4:1$ with modified etch properties, said tapered modified zone having a base with a diameter greater than about 1 µm and a tip having a diameter less than about 250 nm, which is less than the wavelength of the laser pulses, said tip being proximate said bottom surface; and selectively etching into said modified zone from said tip so that as said selective etching proceeds longitudinally into said modified zone, the progressively increasing width of said modified zone compensates for lateral etching occurring at said tip so as to produce a generally cylindrical hole at least partially extending into said modified zone.

39. A method as claimed in claim 38, wherein said tip is about 10 µm from said bottom surface.

40. A method of fabricating a microstructure in a transparent dielectric material, comprising:

focusing femtosecond laser pulses into said dielectric at a sufficient peak power, intensity and energy dosage to create a highly tapered modified zone having a length:width ratio $\geq 4:1$ with modified etch properties, said tapered modified zone having a central region with a central wider portion tapering to opposed tips; and selectively etching into said modified zone.

41. A method as claimed in claim 40, wherein selective etching takes place from the tips of the modified zone so that as said selective etching proceeds longitudinally into said modified zone, the progressively increasing width of said modified zone compensates for lateral etching occurring at said tip so as to produce a generally cylindrical hole.

42. A method as claimed in claim 1, wherein multiple laser beams are combined to generate said pulses and permit the field distribution in the focal volume of said laser beams to be changed so as to vary the shape of said modified zone.

43. A method as claimed in claim 1, wherein aspherical lens element(s) are included in said laser beam to change the field distribution in the focal volume of said laser beam to vary the shape of said modified zone.

44. A method as claimed in claim 1, wherein a one and/or two-dimensional array of said modified zones is formed.

45. A method as claimed in claim 1, wherein the state of polarization of the laser is unpolarized.

46. A method as claimed in claim 1, wherein the state of polarization of the laser is linear and the polarization is rapidly rotated.

47. A method as claimed in claim 1, wherein said selective etching is carried out by selectively etching part way into said tapered modified zoned from said tip to create a main channel coupled to a laterally extending modified zone of modified refractive properties constituting a waveguide.

* * * * *